UNITED STATES PATENT OFFICE.

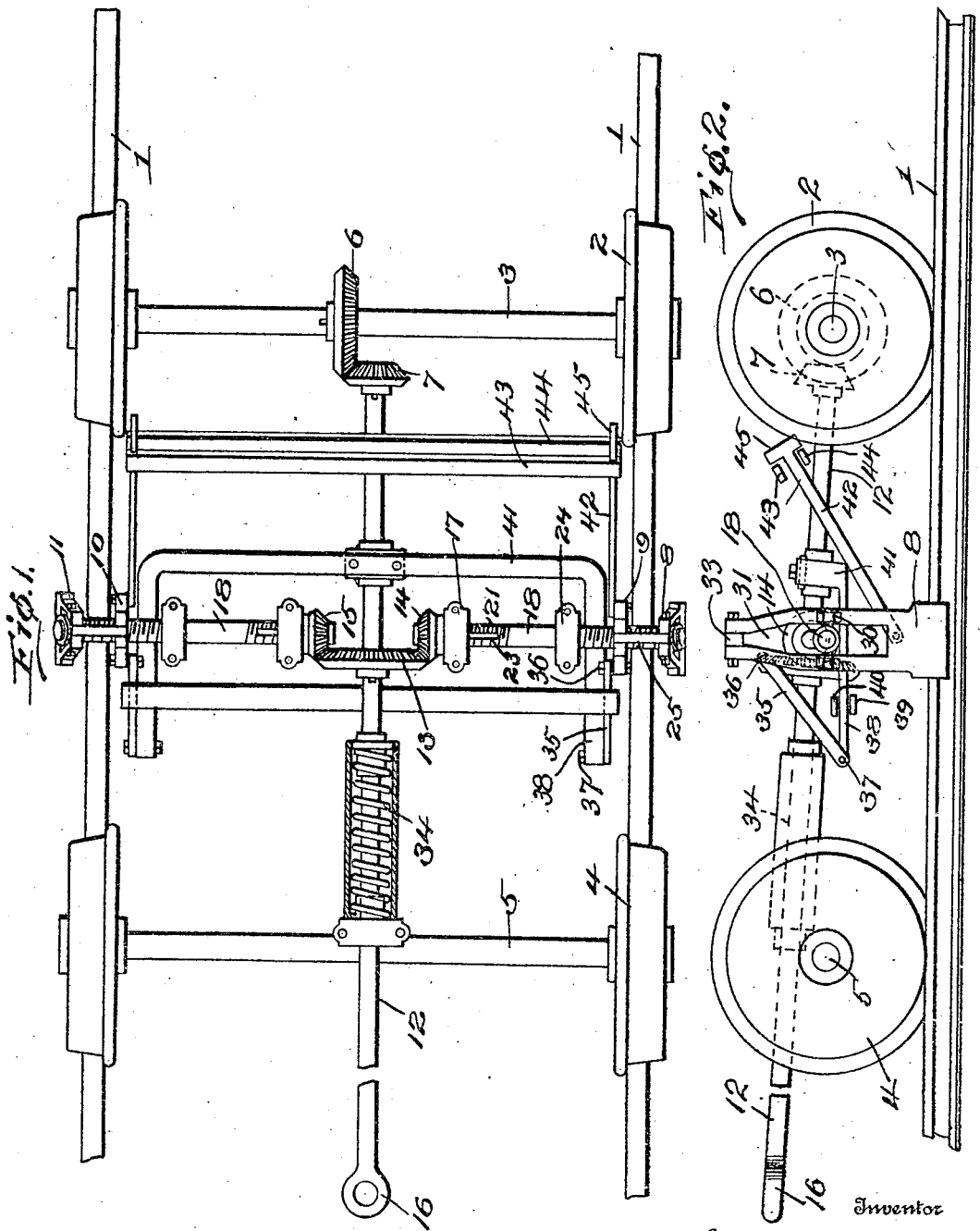

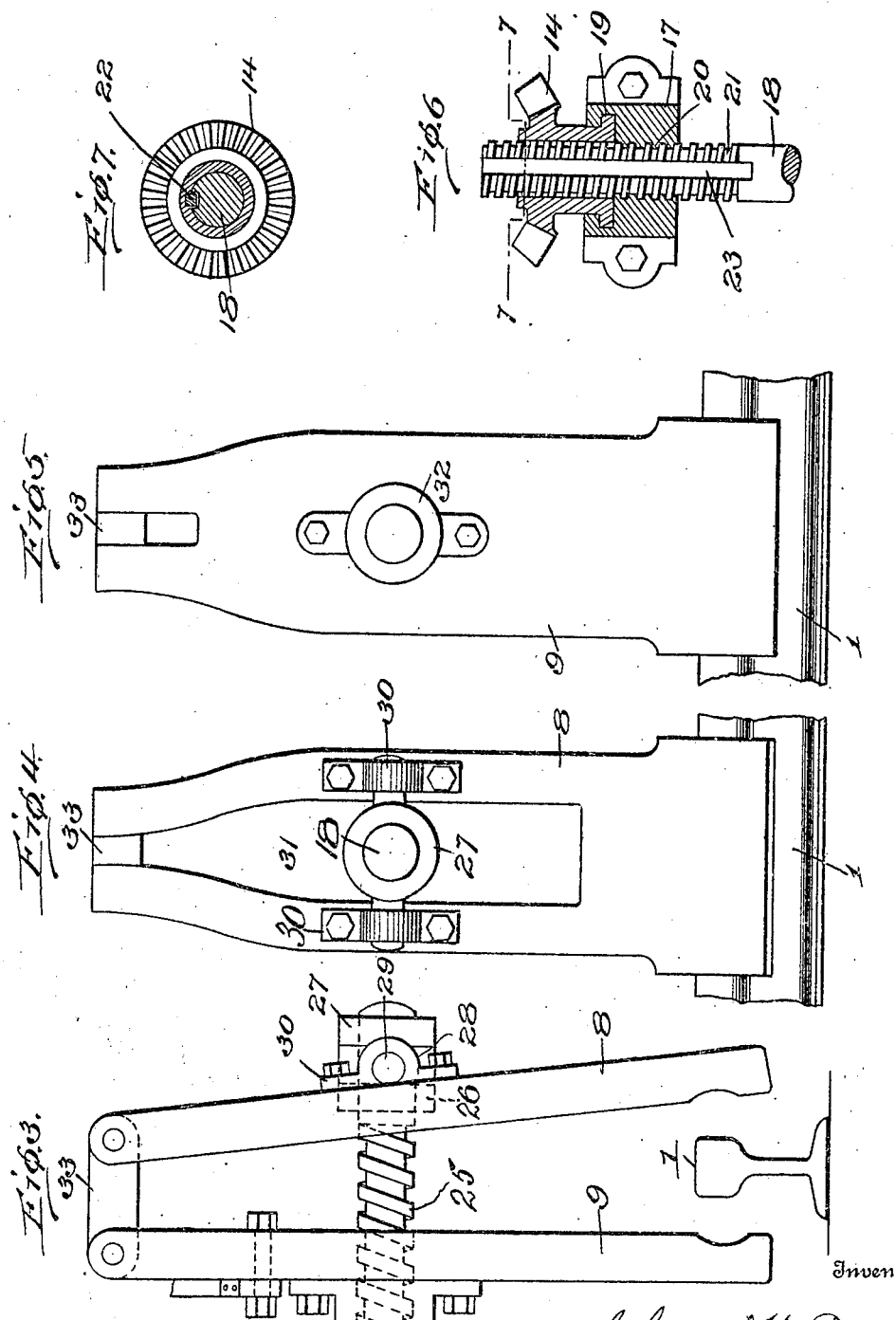

CHARLES W. BURRIS, OF BLACK DIAMOND, WASHINGTON.

SAFETY DEVICE.

943,862.

Specification of Letters Patent.   Patented Dec. 21, 1909.

Application filed March 10, 1909.   Serial No. 482,556.

*To all whom it may concern:*

Be it known that I, CHARLES W. BURRIS, a citizen of the United States, residing at Black Diamond, in the county of King and State of Washington, have invented certain new and useful Improvements in Safety Devices; and I do hereby declare the following to be a full, clear, and exact description of the invention, such as will enable others skilled in the art to which it appertains to make and use the same.

This invention relates to improvements in safety devices, and particularly to safety devices for cars, conveyers, elevators, and the like, which will automatically be moved for stopping the car or other device when the same is moved in a reverse direction from its ordinary and correct direction of movement.

The object in view is the provision of means operable by the movement of the car to which the same is secured that will engage the rail with a gripping action for preventing any considerable movement of the car.

A further object of the invention is the provision of a car and gripping member arranged to grip the rail upon which the car is mounted, and means for connecting the gripping member with the wheels of a car when the car is moved backward, whereby the gripping member grips the rail and positively locks the car against movement.

A still further object of the invention is the arrangement of rail clamping members mounted upon a car having connected therewith rotating threaded shafts for causing said clamping members to engage the rails when rotated in one direction, and means connecting said shafts with the wheels of the car when power is removed from the draw bar of the car, whereby any reverse movement of the car will actuate said shaft for causing said clamps to engage the rails upon which the car is mounted.

With these and other objects in view the invention comprises certain novel constructions, combinations and arrangement of parts as will be hereinafter more fully described and claimed.

In the accompanying drawings: Figure 1 is a top plan view of a car with the body removed. Fig. 2 is a side elevation of the structure shown in Fig. 1. Fig. 3 is an enlarged detail fragmentary edge view of the rail clamp. Fig. 4 is a front view of the rail clamp shown in Fig. 3. Fig. 5 is a rear view of the clamp shown in Fig. 3. Fig. 6 is a detail sectional view through one of the gears and supporting bearings embodying certain features of the invention. Fig. 7 is a section through Fig. 6 approximately on line 7—7.

Referring to the drawing by numerals, 1 indicates supporting rails, 2 the rear wheels of a car to which are secured an axle 3, and 4 indicates the front wheels connected by an axle 5, the axles 3 and 5 supporting the car body not shown.

Rigidly secured to axle 3 is a gear wheel 6 arranged to mesh with a gear wheel 7 from which power is transmitted through various mechanism hereinafter fully described to a pair of clamping members 8 and 9, and 10 and 11. These clamping members are arranged to clamp the rails 1 upon which the wheels 2 and 4 are located so as to prevent movement of the same in one direction.

Gear wheel or pinion 7 is rigidly secured to the draw bar 12, and is preferably made one half the size of gear wheel 6. Rigidly secured to draw bar 12 is another gear 13 that is arranged to connect or transmit power to pinions 14 and 15. If desired draw bar 12 could be provided with a swivel intermediate its length for permitting gear 13 and pinion 7 to revolve without revolving eyelet 16, though ordinarily such structure is not necessary. Pinion 14 meshing with gear 13 is mounted in a bearing member 17 more clearly shown in Fig. 6. The gear 14 is formed with a smooth bore through which a threaded shaft 18 is designed to pass, and is also formed with a flange 19 for engaging a groove in bearing member 17, bearing member 17 being made in parts so as to permit the assembling of the same over flange 19. The bearing member 17 is also provided with threads 20 for engaging the threads 21 of shaft 18, whereby said shaft is moved longitudinally whenever the same is rotated.

In order to convey power from gear 13 to shaft 18 pinion 14 is provided with a key 22 which is rigidly secured thereto and arranged to be loosely mounted in a key-way 23 formed in shaft 18. By this structure whenever pinion 14 rotates key 22 will rotate shaft 18, and as shaft 18 is rotated the same moves longitudinally. Shaft 18 is supported near its outer end by a bearing member 24 of any desired kind, and is threaded at 25 in the same direction as threads 21, but with twice the pitch thereof. The outer end of shaft 18 has rigidly secured thereto spaced collars 26 and 27 and a loosely mounted collar 28 positioned between collars 26 and 27, the same having trunnions or journal members 29. The trunnions 29 are held in position by suitable brackets 30—30 whereby whenever shaft 18 is moved longitudinally in a direction toward the center of the car member 8 will be moved inward toward rail 1.

As shown in Fig. 4 the gripping member 8 is bifurcated or formed with an opening 31 so as to accommodate a free pivotal movement of shaft 18. By this construction and the action of bearing member 17 and pinion 14 gripping member 8 will be brought inward against rail 1 for gripping the same. In order that gripping member 9 may also be moved against rail 1 the same is provided with an aperture through which shaft 18 passes, and also a threaded nut 32, the pitch of the threads of which are twice that of the pitch of the threads 21 so as to accommodate threads 25. In this manner as shaft 18 rotates the same is drawn toward the center of the car, and gripping member 8 is drawn toward the center of the car. At the same time threads 25 will act upon nut 32 and force the same outward or toward rail 1, and as the threads are of twice the pitch of threads 21 the gripping member 9 will move outward at the same rate of speed as gripping member 8 will be moved inward so as to engage the rail 1 at the same time. A connecting bar 33 is pivotally secured to both of the gripping members 8 and 9 at the upper ends so as to form a fulcrum for causing a firmer gripping action against rail 1. By this construction and arrangement it will be observed that whenever the car breaks away from its motive power and begins to move backward the rotation of wheels 2 will move wheels 6 and power will be conveyed from the same to pinion 7, from which power is conveyed to pinions 14 and 15, and from pinions 14 and 15 to shafts 18 and 18'. From shafts 18 and 18' power will be conveyed to gripping members 8 and 9 and 10 and 11 for gripping rail 1, whereupon the car will be immediately stopped. Pinion 15, shaft 18' and associated parts are constructed similar to shaft 18, pinion 14 and associated parts, and will therefore need no further description, the same being simply located on the opposite side of the car.

In ordinary operation the motive power is attached to the car in eyelet 16, and as power is applied the draw bar 12 will be pulled forward against the action of spring 34 which normally holds gear wheel 13 in mesh with pinions 14 and 15 and pinion 7 in mesh with gear 6. As soon as pinion 7 and gear 13 have been disengaged and spring 34 compressed the car will begin to move forward. If, for any reason the car should break away from its motive power spring 34 would cause gear 13 to mesh with pinions 14 and 15, and pinion 7 to mesh with gear 6. If at this time the car were going up an incline, the same would naturally stop and then start to go down the incline. Immediately after the power has been removed from the car the gears will mesh as set forth and upon the downward or rearward movement of the car for a short distance the various moving parts will operate as heretofore set forth for causing gripping members 8 and 9 and 10 and 11 to firmly grip the rails 1. By this construction it will be observed that the gripping members engage the rails before the car has attained any considerable momentum, and will therefore effectually lock the car against downward movement. All that is necessary to loosen gripping members 8 and 9 and 10 and 11 is to pull forward the car a short distance without using draw bar 12. This will operate shafts 18 and 18' and associated parts in the opposite direction for opening up the gripping members. The power then may be applied to draw bar 12 and the car moved from place to place in the usual way. As long as power is applied to draw bar 12 gear 13 and pinion 7 are out of mesh. If desired springs capable of being wound and unwound may surround shafts 18 and 18' so as to remove gripping members 8 and 9 and 10 and 11 from engagement with the rails when power is applied to draw bar 12 so as not to necessitate a forward movement of the car.

In use the safety attachment embodying the invention, is adapted to be used particularly with mine cars, and in order that the gripping members 8 and 9 and 10 and 11 may not be down near the rails and liable to engagement with various matter placed along the track, means are provided for normally raising the gripping members above the track. These means are adapted to be operated for lowering the gripping members immediately upon power being disconnected from draw bar 12 so that upon any rearward movement of the car the gripping members will engage the rails. These means are shown more particularly in Figs. 1 and 2 in which, 35 is a bar pivotally mounted at 36 to gripping member 9. Bar 35 is also pivoted at 37 to a reciprocating bar 38 which in turn moves between guides 39 and 40. Guides 39 and 40 are supported on the car in any desired manner. Reciprocating bar 38 is rigidly secured to a cross bar 41 which in turn is rigidly secured to draw bar 12. By this mechanism whenever power is applied to draw bar 12 not only will gear 13 and pinion 7 be disengaged, but cross bar 41 will be moved toward the front of the car, and bar 38 at each side of the car will be moved longitudinally and exert a pulling action upon bar or link 35. This will pull the upper end of all of the gripping members forward, and as the same are pivotally mounted upon shaft 18 and 18' the lower end of the same will be moved upwardly and rearwardly. In order to limit the forward movement of the lower end of the gripping members, and also to guide the same in their movement, bars or links 42 are pivotally secured to gripping members 9 and 10 and pass upward through guides 43 and 44 which also act as stops. The bar or link 42 is formed with a head 45 which engages bar or link 44 for limiting the downward movement of the gripping members. The guides 43 and 44 are secured to the car in any desired or preferred manner. By this construction and arrangement it will be observed that whenever power is applied to draw bar 12 the gripping members will have their ends swung upwardly and rearwardly, and also the mechanism for operating the same will be thrown out of gear. Immediately upon power being disconnected from draw bar 12 the mechanism for operating the gripping members will be thrown into mesh and also the lower end of the gripping members will be thrown downwardly and forwardly ready for engaging the rails upon a rearward movement of the car.

The mechanism embodying the invention is preferably used upon any car or conveyer running on tracks, and is adapted to be used particularly on cars operating on inclined runways or tracks so that in case any of the cars should break away from their pulling or motive power the same would be quickly and automatically stopped by the gripping members engaging the rails.

In the drawings is shown one embodiment of the invention as applied to a car, and the various threads set forth therein are shown as left-hand threads, but it will be of course evident that the threads may be changed to right-hand threads upon readjustment of the gears, or rearrangement of the same.

Other slight changes and adaptations may be made as will be evident within the spirit of the invention.

What I claim is:

1. In a safety appliance, a pair of gripping members, means for normally holding the same out of operation, and a revolving and reciprocating shaft for throwing the same into operation.

2. In a safety appliance for cars, a gripping member for engaging the rail upon which the car is mounted, revolving and reciprocating means for causing the gripping members to engage said rail, and means for normally holding said first mentioned means out of operation.

3. In a safety appliance for cars, a clamping member formed of a plurality of parts for gripping the rail upon which the car is mounted, a reciprocating shaft acting upon said clamping member for causing the same to grip said rail, and means connecting said shaft with the wheels of the car, whereby upon the rearward movement thereof said clamping member will be operated for engaging said rail.

4. In a safety appliance for cars, a pair of gripping members, a shaft connected to said gripping members for operating the same, a draw bar, means mounted on the draw bar and connected with said shafts for rotating the same when the draw bar has been disconnected from its motive power, and means for connecting said draw bar with the wheels of the car for rotating the draw bar when the motive power has been removed from the draw bar, whereby power is transmitted from the wheels of the car to said shafts for operating said gripping members.

5. In a safety appliance for cars, gripping members for engaging the rails upon which the car is mounted, means for connecting the gripping members with some of the wheels of the car, said means being designed to so connect the gripping members and the wheels of the car as to cause the gripping members to clamp said rails upon the rearward movement of said car, and means for moving the gripping members above said rails when the car is moved forward.

6. In a safety appliance for cars, a gripping member on each side of said car for gripping the rails upon which the car is located, a revolving and reciprocating shaft connected to each of said gripping members for operating the same, a reciprocating draw bar, means for connecting said shafts and said draw bar when the draw bar has been disconnected from its motive power, and means for connecting the draw bar with some of the wheels of the car, whereby the same is rotated when the draw bar is connected with said shafts, whereby power is conveyed from said wheels to said revolving and reciprocating shafts for operating said gripping members.

7. In a safety appliance for cars, a gripping member on each side of the car arranged to grip the rails upon which the car is located, means for connecting said gripping members and some of the wheels of said car for causing the gripping members to engage said rails when the car is moved rearwardly, and means connected with the draw bar of the car for causing said gripping members to be swung above said rails when the car is being moved forwardly.

8. In a safety appliance for cars, a gripping member on each side of the car adapted to grip the rails upon which the car is located, each of said gripping members comprising a pivotally mounted gripping jaw, a rotating and reciprocating shaft connected to the outer jaw of each of said gripping members, means for connecting the inner jaw of each of said gripping members to said shafts for causing the inner gripping jaws to move outwardly upon the rotation of said shafts, means for rotating and moving longitudinally said shafts, whereby said outer and inner jaws are moved toward each other for gripping said rails, a reciprocating draw bar, means for connecting said draw bar and said shafts for conveying rotary movement from said draw bar to said shafts for normally holding said last mentioned means in engagement, and means secured to said draw bar for connecting the same with the wheels of a car, whereby motion is conveyed upon movement of said car to said gripping members for causing the same to grip said rails, said last mentioned means being connected with the wheels of the car when the reciprocating draw bar is connected with said shafts.

In testimony whereof I affix my signature in presence of two witnesses.

CHARLES W. BURRIS.

Witnesses:
G. WARD KEMP,
ALEXANDER HUTCHINSON.